United States Patent
Terry et al.

[11] Patent Number: 5,980,996
[45] Date of Patent: Nov. 9, 1999

[54] SYSTEM AND METHOD FOR CONTROLLING WATER FLOW THROUGH GROUND WITH A GEOTEXTILE COMPRISING WATER ABSORBING MATERIAL

[75] Inventors: Mark Edward Terry, Rockmart; Martin G. Hoskins, Brunswick; Connie Hensler, Kennesaw, all of Ga.

[73] Assignee: Interface, Inc., LaGrange, Ga.

[21] Appl. No.: 09/055,587

[22] Filed: Apr. 6, 1998

Related U.S. Application Data

[60] Continuation-in-part of application No. 08/822,675, Mar. 24, 1997, Pat. No. 5,756,159, which is a division of application No. 08/354,676, Dec. 13, 1994, Pat. No. 5,614,269.

[51] Int. Cl.$^6$ ........................................................ B05D 3/06
[52] U.S. Cl. ........................... 427/513; 427/519; 427/520
[58] Field of Search ................................. 427/508, 513, 427/517, 519, 520

[56] References Cited

U.S. PATENT DOCUMENTS

| | | |
|---|---|---|
| 4,125,644 | 11/1978 | Ketley et al. . |
| 4,324,575 | 4/1982 | Levy . |
| 4,479,984 | 10/1984 | Levy et al. . |
| 4,522,465 | 6/1985 | Bishop et al. . |
| 4,738,867 | 4/1988 | Itoh et al. . |
| 4,741,597 | 5/1988 | Broer . |
| 4,741,958 | 5/1988 | Bishop . |
| 4,770,898 | 9/1988 | Sugai et al. . |
| 4,790,688 | 12/1988 | Castor ................................... 405/128 |
| 4,798,852 | 1/1989 | Zimmerman et al. . |
| 4,867,526 | 9/1989 | Arroyo . |
| 4,892,754 | 1/1990 | Itoh et al. ............................. 427/54.1 |
| 4,909,592 | 3/1990 | Arroyo et al. . |
| 4,990,373 | 2/1991 | Kittle ..................................... 427/244 |
| 5,082,347 | 1/1992 | Akasaka et al. . |
| 5,179,619 | 1/1993 | Bosisio et al. . |
| 5,182,786 | 1/1993 | Kinaga et al. . |
| 5,244,934 | 9/1993 | Umeda et al. ........................ 522/129 |
| 5,275,509 | 1/1994 | Honeycutt ............................ 405/129 |
| 5,593,736 | 1/1997 | Cowen et al. ........................ 427/492 |
| 5,614,269 | 3/1997 | Hoskins et al. ...................... 427/512 |
| 5,756,159 | 5/1998 | Hoskins et al. ...................... 427/394 |
| B1 5,199,098 | 2/1995 | Nolan et al. . |

FOREIGN PATENT DOCUMENTS

| | | |
|---|---|---|
| 2184047 | 2/1997 | Canada . |
| 62-225507 | 10/1987 | Japan . |
| 6-007759 | 1/1994 | Japan . |
| 9-052323 | 2/1997 | Japan . |
| 91/04786 | 4/1991 | WIPO . |
| 98/06570 | 2/1998 | WIPO . |

OTHER PUBLICATIONS

Castor, Innovative Hazard. Waste Treat. Technol.Ser. (1990), 2 (Phys./Chem. Processes), pp. 211–220, 1990.

Heiser et al, Technol. Programs Radioact. Waste Manage. Environ. Restor. (1994), (vol. 2), pp. 1057–1062, 1994.

*Primary Examiner*—Erma Cameron
*Attorney, Agent, or Firm*—Jones & Askew, LLP

[57] ABSTRACT

A water absorptive material comprising a fibrous substrate impregnated with a water absorptive, water insoluble polymer, wherein the polymer is intertwined and interlocked with fibers of the fibrous substrate, and the use of such water absorptive material to form a water control zone to prevent water egress from the water control zone into adjacent ground or water ingress into the water control zone from adjacent ground.

15 Claims, 1 Drawing Sheet

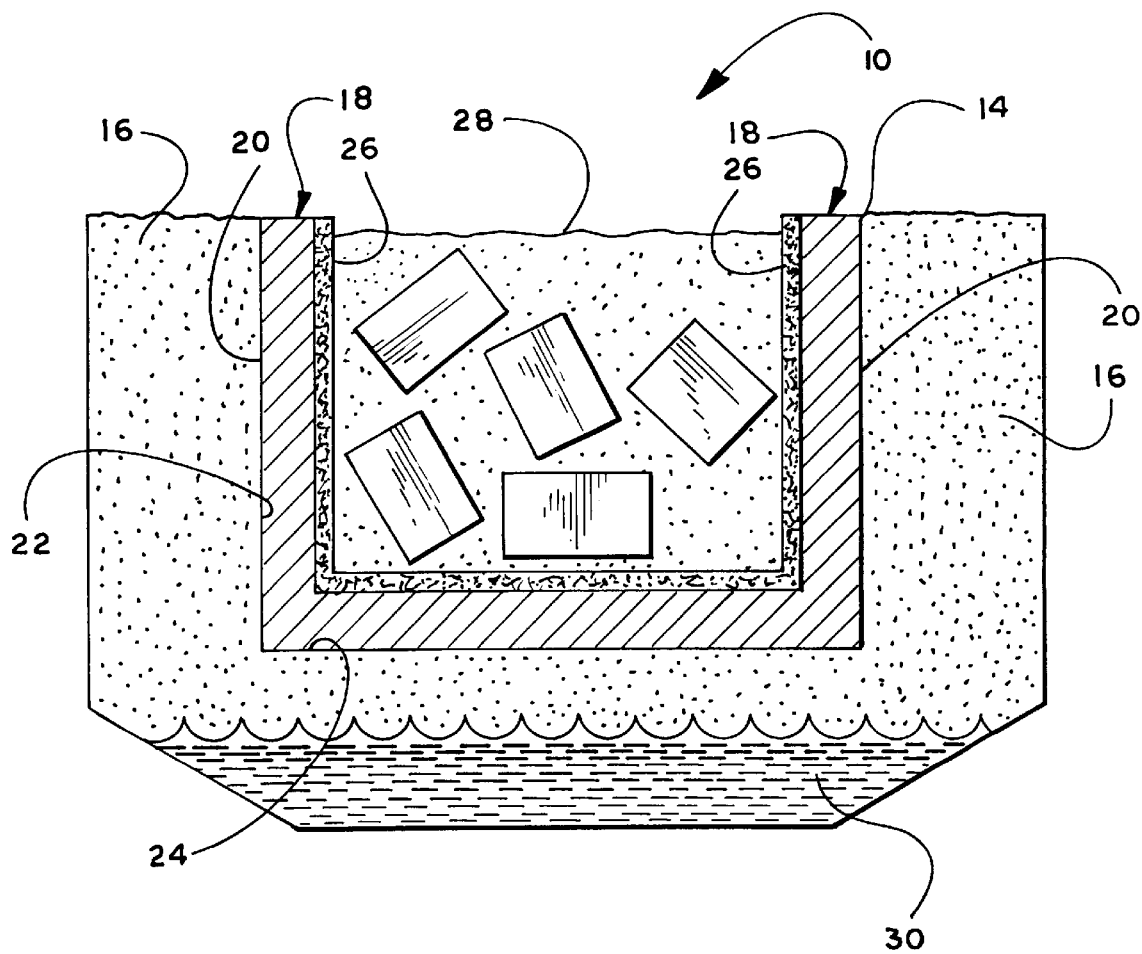
Fig_1

SYSTEM AND METHOD FOR CONTROLLING WATER FLOW THROUGH GROUND WITH A GEOTEXTILE COMPRISING WATER ABSORBING MATERIAL

CROSS REFERENCE TO RELATED APPLICATIONS

This application is a continuation-in-part of U.S. application Ser. No. 08/822,675 filed on Mar. 24, 1997, now U.S. Pat. No. 5,756,159 which is a divisional of U.S. application Ser. No. 08/354,676, filed Dec. 13, 1994 which has issued as U.S. Pat. No. 5,614,269.

TECHNICAL FIELD OF THE INVENTION

The present invention relates to water absorbing materials, particularly water absorptive polymeric materials, and use of such materials to control water flow through ground and to protect cables such as fiber optic cables.

BACKGROUND OF THE INVENTION

Commonly owned and related U.S. Pat. No. 5,614,269 discloses a method of making a water absorptive article comprising a water absorptive, water insoluble polymer and discloses the use of such a water absorptive article to protect cable, such as fiber optic cable, from water from the ingress of moisture and water into the cable. As explained in U.S. Pat. No. 5,614,269 ingress of water into cable is a substantial and persistent problem in the cable industry. Such ingress often results from changes in ambient conditions which cause differences in vapor pressure between the inside and the outside of a cable jacket. Consequently, moisture tends to diffuse in a unidirectional manner from the outside of the cable to the inside of the cable, resulting in an undesirably high moisture level inside the cable. High levels of condensed moisture inside a cable sheath system may have a detrimental effect on the transmission characteristics of a metallic conductor cable.

Furthermore, water may enter the cable as a result of damage to the cable which perforates the external water barrier elements. For example, animal attacks and mechanical impacts often create openings in the sheath system of the cable, which allows water to enter the cable. Once inside the cable sheath system, the water tends to move longitudinally along the cable into splice closures, if not controlled.

In another field, water flow through ground (meaning "earth") can pose problems, if not controlled. Water naturally percolates through the ground and such percolation is normally desirable because it purifies water. Rain water normally percolates through the surface of the ground and eventually flows into the local ground water system.

It is desirable to prevent percolation of water through ground in some instances. For example, it is desirable to prevent water egress from waste disposal sites into the adjacent ground and water ingress into waste disposal sites from the adjacent ground to avoid contamination of the local ground water by toxins in the waste disposal site. A landfill is a specific example of such a waste disposal site.

Bentonite clay has been used to block water flow into and out of waste disposal sites, but bentonite clay tends to migrate during use, leaving water permeable areas, and is heavy and therefore expensive to transport.

Accordingly, in addition to controlling water ingress into cables, there is also a need to control water flow through the ground, and there is a particular need to control water egress from a waste disposal site into the adjacent ground and water ingress from the adjacent ground into the waste disposal site.

SUMMARY OF THE INVENTION

The present invention solves the above described problems in the prior art by providing a water absorbent material comprising a fibrous substrate impregnated with a water absorptive, water insoluble polymer, wherein the polymer is intertwined and interlocked with fibers of the fibrous substrate. Advantageously, the water absorbing material of the present invention is not bulky or heavy. Furthermore, the water absorbent material of the present invention does not suffer from problems associated with delimitation or substantial loss of water absorbing material during handling and application, because the water absorbent material is polymeric in nature and is intertwined and interlocked with the fibers of the substrate such that water absorbing material becomes intimately and integrally associated with the substrate and is not easily moved from or within the fibrous substrate.

The present invention further encompasses a method of making a water absorptive, water insoluble material comprising the steps of (1) impregnating a fibrous substrate with a solution capable of polymerizing upon exposure to UV irradiation to form a water absorptive polymer; and (2) exposing the impregnated fibrous substrate to UV irradiation to polymerize the solution to form a substrate impregnated with a water absorptive, water insoluble polymer, wherein the polymer is intertwined and interlocked with fibers of the fibrous substrate. Desirably, the water absorptive, water insoluble polymer is essentially non-toxic and does not expose workers or the environment to hazardous material. Still another advantage of the present invention is that the method of making the water absorbent material is rapid, straightforward, and economical. Furthermore, the add on weight of the water absorbing material of the present invention can be accurately controlled and the resulting material is highly water absorbent. Yet other features of the present invention are that the residual free monomer concentration is very low, less than about 200 ppm and the polymerization is a single step.

The present invention further encompasses a cable comprising, a water absorptive composition comprising a fibrous substrate impregnated with a water absorptive, water insoluble polymer, wherein the polymer is intertwined and interlocked with fibers of the fibrous substrate, and wherein the water absorptive composition is essentially non-toxic. Because the water blocking composition made by the disclosed method is not bulky or heavy, the cable size and weight can be maintained at a minimum. In addition, the water blocking composition made by the disclosed method does not suffer from problems associated with delimitation or substantial loss of water absorbing material during handling and application to the cable.

The present invention still further encompasses a system and method for controlling the flow of water through ground, meaning earth. Generally described, this method is a method of controlling water egress from a water control zone into ground adjacent the water control zone or water ingress into the water control zone from the adjacent ground and comprises the step of forming a water barrier in or on the ground adjacent the water control zone. The water barrier includes a layer of the above described water absorbent material comprising a fibrous substrate impregnated with a water absorptive, water insoluble polymer, such that the polymer is intertwined and interlocked with fibers of the fibrous substrate. The system of the present invention for controlling the flow of water through ground is a water control zone formed by the described method. When used as a water barrier in ground, the water absorbent material of the present invention can be described as a geotextile.

The foregoing system and method for controlling water is particularly effective, because the water absorptive, water insoluble polymer swells when contacted by water and blocks water passage through the absorbent material. This system and method of the present invention for controlling water flow through ground is particularly suitable for waste disposal sites, such as landfills, because the system and method of the present invention blocks the flow of water in or out of the waste disposal site and prevents water from carrying contaminants from the waste disposal site into the local ground water. Accordingly, the water absorptive, water insoluble polymer of this invention is desirably non-toxic to avoid any harm to the environment and those manufacturing and handling the water absorbent material.

Because the water absorptive, water insoluble polymer of the absorbent material used in the system and method of the present invention for controlling water flow through ground is interlocked and intertwined in the fibrous substrate, the polymer does not migrate during handling or use and therefore does not leave areas of the water barrier permeable to water. As a result, the water barrier in this system and method of controlling water is durable and maintains its barrier properties throughout the extent of the water barrier.

Therefore, an object of the present invention is to provide an improved water barrier material and method for controlling water flow.

Another object of the present invention is to provide an improved system and method for controlling the flow of water through ground.

Still another object of the present is to provide a system and method for controlling water egress from a water control zone into adjacent ground or water ingress into the control zone from adjacent ground.

Yet another object of the present invention is to provide a system and method for controlling water egress from a waste disposal site into adjacent ground or water ingress into the waste disposal site from adjacent ground.

Another object of the present invention is to provide a non-toxic water barrier which is durable and economical.

A further object of the present invention is to provide an absorbent material which is effective for blocking water and absorbing moisture in cables, yet is inexpensive and easy to handle, and a fast and economical method of making such cable.

These and other objects, advantages and features of the present invention are more fully described in the following description.

DETAILED DESCRIPTION OF THE INVENTION

As summarized above, the present invention encompasses a water absorbing material comprising, a fibrous substrate impregnated with a water absorptive, water insoluble polymer, wherein the water absorptive, water insoluble polymer is intertwined and interlocked with fibers of the fibrous substrate, and a method of making a water absorptive material comprising the steps of (1) impregnating a fibrous substrate with a solution capable of polymerizing upon exposure to UV irradiation to form a water absorptive, water insoluble polymer and (2) exposing the impregnated fibrous substrate to UV irradiation to polymerize the solution therein to form a polymer, wherein the water absorptive, water insoluble polymer is intertwined and interlocked with fibers of the fibrous substrate.

The present invention also relates to cables that contain a water absorbing material comprising, a fibrous substrate impregnated with a water absorptive, water insoluble polymer, wherein the polymer is intertwined and interlocked with fibers of the fibrous substrate.

This invention further encompasses a system and method for controlling water flow through ground. Ground as used herein means earth. Generally described, the method of the present invention for controlling water flow through ground includes controlling water egress from a water control zone into ground adjacent the water control zone or water ingress into the water control zone from the adjacent ground. More particularly, this method comprises the step of forming a water barrier in or on the ground adjacent the water control zone. The water barrier includes a layer of absorbent material comprising a fibrous substrate impregnated with a water absorptive, water insoluble polymer, such that the polymer is intertwined and interlocked with fibers of the fibrous substrate. In other words, this aspect of the invention involves the use of the absorbent material of the present invention as a geotextile.

This method of controlling water flow through ground is described in more detail below. First, the method of making the absorbent material is described in detail.

More particularly, the method of making the absorbent material of this invention relates to combining monomers of super absorbent polymers (SAPs) with ultraviolet light-dependent free-radical generators in solution, applying this solution to a fibrous substrate such as a woven or nonwoven fabric, and exposing the monomer impregnated fibrous substrate to UV light to initiate a polymerization reaction. Polymerization of the SAP monomers occurs in and among the interstices of the fibers of the fibrous substrate to form a polymeric structure wherein the polymer is intertwined and interlocked with fibers of the fibrous substrate. The method of this invention for making the absorbent material requires only a single irradiation step to polymerize and cure the water absorptive, water insoluble polymers in the composition. Accordingly, this method is rapid, straightforward and economical.

The water absorbing material thus formed is highly water absorptive—capable of absorbing at least 50 grams of distilled water per gram of polymer, more preferably at least 100 grams of distilled water per gram of polymer, and even more preferably at least 200 grams of distilled water per gram of polymer. Additionally, the water absorbing material is relatively thin and light weight because it is not laminated, and does not lose appreciable water absorbing material upon handling and application to the cable. These advantages are the direct result of the intimate structural relationship achieved by polymerizing SAP monomers in situ in the fibrous substrate. The water absorbing material made by this method is a single structure wherein the network of fibers of the substrate and the network of polymeric chains of water absorbing material are interlaced, intertwined and interlocked. The water absorbing material is therefore, integrally, tightly and permanently associated with the fibrous substrate.

The method of the present invention permits very accurate control of the add on weight of the water absorbing material to the fibrous substrate. Consequently, the water absorbing materials made thereby are uniform with respect to the amount of water absorbing material contained per unit length of substrate along its entire length.

Furthermore, the add-on weight per unit length may be easily adjusted to form, for example, a continuous water absorbing sheet, tape or yarn wherein specific portions of the sheet, tape or yarn contain more or less water absorbing material than the rest of the material. Such materials having variable water absorptive characteristics may have specialized utility in the cable industry. For example, increased water absorptive capacity may be desirable at the ends of predetermined lengths of cable, or in the vicinity of the splice junction, terminals or other connections involving the cable. In particular, water absorbing compositions made according to the method of the present invention are useful in the fiber optic cable or wire industry to control the ingress and movement of water in the cable.

Fibrous substrates used in the invention may be either woven or non-woven, including woven or non-woven polyester, polypropylene, or polyethylene, woven or non-woven fiberglass, or any other fibrous substrate that can be coated with a water based solution. Examples of polyester fibrous substrates include spun-bonded polyester and polyester yarns. Yarns useful in the present invention may also be made of other polymers such as nylon and kevlar.

Water absorbing monomers capable of polymerizing in the presence of UV light-dependent polymerization initiators and UV irradiation include, for example, monomers of polyacrylamide, monomers of acrylic acid at least partially neutralized with an alkali metal such as sodium or potassium, and monomers of polyacrylamide-acrylic acid copolymers. Desirably, the monomers of acrylic acid are neutralized to approximately 40 molar to 100 molar percent, and preferably, to approximately 60 molar to 100 molar percent. The compositions resulting after polymerization is a fibrous substrate having integrally associated therewith a water absorbing polymer such as polyacrylamide, polymers of acrylic acid at least partially neutralized with an alkali metal, and polyacrylamide-acrylic acid copolymers. Particularly, the monomers of acrylic acid are neutralized to approximately 40 molar to 100 molar percent, and preferably, to approximately 60 molar to 100 molar percent.

Crosslinking reagents instrumental in propagating the polymerization and forming a branched network of polymers include, for example, N, N-methylene bis acrylamide (NMBA), polyethylene glycol diacrylate (PEGDA) and polyethylene glycol dimethacrylate (PEGDMA).

UV-dependent photoinitiators of polymerization useful in the present invention are water soluble or water dispersible compounds that generate free radicals upon exposure to UV irradiation. Examples of such polymerization initiators include, 4-benzoyl-N, N-dimethyl-N-(2-(1-oxo-2-propenyloxy)ethyl) benzenemethananaminium bromide (available commercially as Quantacure ABQ) in combination with N-methyl-diethanolamine (NMDEA), and 2-hydroxy-2-methyl-1-phenyl-1-propanone (available commercially as Darocure 1173).

A humectant may optionally be added to the water absorbing material of the present invention. Examples of such humectants include glycerine or water soluble glycols such as polyethylene glycol, and polypropylene glycol.

A surfactant may optionally be added to facilitate wetting of fibers in the fibrous substrate so that the water absorbing solution capable of polymerizing upon exposure to UV irradiation to form a water absorptive, water insoluble polymer is sufficiently in contact with the fibers to ensure effective intertwining and interlacing of the polymers with the fibers of the substrate. An example of a surfactant useful with fiberglass fibrous substrates is alcohol ethoxy sulfate, available under the tradename Sterol CS-460 from Van Waters & Rogers, Inc.

The ranges of specific amounts of the various components that form the water absorbing solution capable of polymerizing upon exposure to UV irradiation to form a water absorptive, water insoluble polymer are as follows.

| Concentration Ranges | | |
|---|---|---|
| | Range | Desirable |
| acrylamide to acrylic acid ratio | 0–50% by weight | 0% |
| % solids of final formulation | 25–50% | 45% |
| Alkali metal hydroxide | 60–100% neutralization of acrylic acid | 98–100% |
| UV initiator[1] (Quantacure ABQ, available from Biddle Sawyer) | 0.25–4% | 0.5% |
| N-Methyl Diethanol Amine | 0–2% | 1.0% |
| Crosslinker[1] (PEGDA) | 0–1% | 0.16% |
| Humectant[1] (Glycerine) | 0–7.5% | 2.5% |
| Wetting Agent[1] (Steol CS-460) | 0–1.5% | 0.45% |

[1]Percentage concentration based on combined weight of water, acrylic acid, acrylamide, and alkali metal hydroxide.

It was discovered unexpectedly that the water absorbing compositions of the present invention could be cured with a substantial amount of water still in the composition when made with an exclusively water-based system. In contrast, most if not all other UV curable water-based water absorbing compositions, for example those made with urethane or acrylics, require applying the UV curable dispersion to the substrate, drying and subsequently curing the composition by exposure to UV light. Furthermore, drying the composition of the present invention prior to UV curing results in the formation of a finely divided white powder that does not react upon exposure to UV light. A complication associated with the wet curing process of the present invention is that the UV lights expose the reactive monomer mixture to substantial infrared radiation causing the monomer mixture to heat up. This can lead to boiling of the mixture and the formation of undesirable gas bubbles which scatter the UV light and thus reduce curing efficiency. Additionally, the rate of curing is temperature dependent and thus uncontrolled heating of the monomer mixture necessitates changes in line speed or other reaction parameters. Consequently, care must be taken to control the temperature of the monomer mixture.

It was also the found that the distance of UV lights from the polymerizing water absorbing material was instrumental in changing the character of the polymeric structure formed. For example, when the UV lamps were less than 18 inches away from the monomer impregnated substrate the polymeric chains formed were short, resulting in a structure that was water soluble. In contrast, when the UV lamps were moved to 18 inches away from the monomer impregnated substrate, the polymeric chains were long, resulting in water insolubility and high water absorbing capacity. Distances of greater than 18 inches may be used, however, the intensity of the UV radiation diminishes and line speed must be adjusted accordingly to ensure that water absorptive, water insoluble polymers are formed. Additionally, increased production line speed may be achieved by increasing the number or intensity of the UV lamps utilized. Generally the UV intensity useful for curing the super absorbing compositions of the present invention will range from 20 watts/inch to 700 watts/inch, and will result in the formation of a water absorptive, water insoluble polymer.

Another surprising and unexpected discovery was that formulations containing high monomer percent solids result in the formation of a water absorptive composition that is essentially non-toxic, i.e. has a residual free monomer concentration of less than about 200 ppm. For example when potassium acrylamide was added to 45% total solids of the formulation, the resulting polymer had low residual free monomer. In contrast, when the monomer percent solids was reduced to, for example, 30%, the amount of free monomer in the composition increased. High levels of residual free monomer pose a substantial health hazard for workers.

It was also found that the water absorbing capacity of the composition could be dramatically increased by alkali neutralization of the monomer formulation prior to impregnation of the fibrous substrate. While acceptable water absorbing compositions of the present invention have been made with up to 5000 ppm residual free monomer in the cured product, it is more desirable to produce super absorbing polymers having a concentration of less than 100 ppm free monomer to minimize worker health risks. The methods and compositions of the present invention permit production of water-absorbing compositions having less than 100 ppm free monomer.

The water absorbing composition according to the present invention can be, for example, yarns or tapes or sheets depending upon the particular dimensions and characteristics of the fibrous substrate utilized. Generally tapes of various widths are be cut from wider production stock by methods well known in the art.

BRIEF DESCRIPTION OF THE DRAWING

FIG. 1 is a water control zone made according to an embodiment of the present invention.

Turning to FIG. 1, a water control zone 10 made according to an embodiment of the present invention is illustrated. In FIG. 1, the water control zone 10 is a landfill waste disposal site generally comprising a hole or reservoir 14 extending into ground 16 adjacent the reservoir and a water barrier 18 disposed in reservoir adjacent the surrounding ground. The water barrier 18 includes a barrier substrate layer 20 covering the sides 22 and bottom 24 of the reservoir 14 and a layer of absorbent material 26 of the present invention covering the interior of the barrier substrate layer. The reservoir 14 of the landfill 10 can then be filled with waste 28.

Suitable materials for the barrier substrate layer include concrete, cement, or other supporting material. It should be understood, however, that the water control zone 10 can be formed without a barrier substrate layer 20. Alternatively, the water barrier can be formed solely of the water absorbent material 26 of the present invention.

The water absorbent material 26 is made in accordance with the method described above and desirably includes a fibrous substrate impregnated with a water absorptive, water insoluble polymer, wherein the polymer is intertwined and interlocked with fibers of the fibrous substrate. Desirably, the fibrous substrate is a polymeric nonwoven material such as polypropylene, polyethylene, or polyester nonwoven fabric material. More desirably, the fibrous substrate of the absorbent material is needle punched or otherwise perforated. The water absorbent material 26 is desirably made into long wide sheets for formation of the water control zone 10. The sheets of water absorbent material 26 are laid generally parallel to one another and slightly overlapping to form the water barrier 18. As mentioned above, when used on or near the ground to form a water control zone, the water absorbent material of the present invention can be described as a geotextile.

The water barrier 18 of the water control zone 10 illustrated in FIG. 1 blocks water from egress out of the reservoir 14 into the surrounding ground 16 and blocks water from ingress into the reservoir from the surrounding ground. By blocking water flow in and out of the landfill reservoir 14 into the surrounding ground 16, the water barrier 18 prevents contamination of the local ground water 30. In addition to controlling water flow in and out of waste disposal sites, the water absorbent material of the present invention is useful to prevent water flow through ground adjacent buried tanks and other containers and clean water reservoirs, and is useful to prevent water flow from the ground into structures such as building foundations and basements.

The water absorbent yarns and tapes according to the present invention can also be incorporated into cables, generally being interposed between the core and the external sheath, covering or jacket. The yarns and tapes may incorporated by helically wrapping the yarn or tape longitudinally along the axis of the cable core. Alternatively the water absorbing yarns or tapes may run in a linear longitudinal direction along the axis of the cable. The water absorbing of the present invention may also be incorporated in cables by concentric multi-layered wrapping at splice junctions, terminals and other connections. Various other methods of incorporating the water absorbing composition of the present invention are well known to those skilled in the art.

The invention is further described by the following examples.

EXAMPLE 1

To a reactor equipped with good agitation and cooling capable of maintaining the reaction temperature below 40° C., add 44 parts of water. With the agitator on and cooling on, add 66 parts of acrylic acid. Slowly add 110 parts of 50% potassium hydroxide at a rate such that the temperature of the mixture does not exceed 40° C. Agitate for 1 hour with cooling. Add 1 part Steol CS-460, 1.1 parts Quantacure ABQ, 2.2 parts NMDEA, 0.35 parts PEGDA, and 5.5 parts Glycerine and agitate for 15 minutes. This procedure yields a 45% solids UV curable SAP monomer solution.

The resulting solution was used to impregnate a 6.8 mil, 6.03 oz/yd$^2$ woven fiberglass. The impregnated fiberglass was then exposed to four 300 watt/inch mercury arc UV curing lamps. The lamps were arranged with two lamps above the fabric and two below. The lamps were equipped with eliptical reflectors and located 18 inches from the material. The lamps were arranged with a horizontal offset of 2 feet from the center of the one bulb to the center of the next. The impregnated material was passed through this exposure at a speed of 8 feet/minute. After exiting the lamps, the material passed through a 30 foot convection drying oven set at a temperature of 260° F. The moisture of the final composition was <5%. The final composition was approximately 35% polymer by weight and has the capability to absorb 250 grams of distilled water/gram of polymer with a free monomer content of approximately 60 ppm based on final composition weight. The low monomer content reduces worker exposure and associated health risks during cable manufacturing.

EXAMPLE 2

To a reactor equipped with good agitation and cooling capable of maintaining the reaction temperature below 40°

C., add 200 parts of water. With the agitator on and cooling on, add 66 parts of acrylic acid. Slowly add 110 parts of 50% potassium hydroxide at a rate such that the temperature of the mixture does not exceed 40° C. Agitate for 1 hour with cooling. Add 1 part Steol CS-460, 1 part Darocure 1173, available from Ciba-Geigy Corp., and 0.6 parts NMBA and agitate for 15 minutes. This procedure yields a 27% solids UV curable SAP monomer solution.

The resulting solution was used to impregnate a 6.8 mil, 6.03 oz/yd$^2$ woven fiberglass. The impregnated fiberglass was then exposed to four 300 watt/inch mercury arc UV curing lamps. The lamps were arranged with two lamps above the fabric and two below. The lamps were equipped with eliptical reflectors and located 18 inches from the material. The lamps were arranged with a horizontal offset of 2 feet from the center of one bulb to the center of the next. The material was passed through this exposure at a speed of 8 feet/minute. After exiting the lamps, the material passed through a 30 foot convection drying oven set at a temperature of 260° F. The moisture of the final composition was <5%. The final composition is approximately 23% polymer by weight and has the capability to absorb 200 grams of distilled water/gram of polymer with a free monomer content of approximately 500 ppm based on final composition weight.

EXAMPLE 3

To a reactor equipped with good agitation and cooling capable of maintaining the reaction temperature below 40° C., add 44 parts of water. With the agitator on and cooling on, add 66 parts of acrylic acid. Slowly add 110 parts of 50% potassium hydroxide at a rate such that the temperature of the mixture does not exceed 40° C. Agitate for 1 hour with cooling. Add 1 part Steol CS-460, 1.1 parts Quantacure ABQ, 2.2 parts NMDEA, 0.35 parts PEGDA, and 5.5 parts Glycerine and agitate for 15 minutes. This procedure will yield a 45% solids UV curable SAP monomer solution.

The resulting solution was used to impregnate a 4.0 mil, 0.5 oz/yd$^2$ nonwoven polyester. The impregnated polyester was then exposed to two 125 watt/inch and then two 300 watt/inch mercury arc UV curing lamps. The lamps were arranged with two lamps above the fabric and two below. The lamps were equipped with eliptical reflectors and located 18 inches from the material. The lamps were arranged with a horizontal offset of 2 feet from the center of one bulb to the center of the next. The material was passed through this exposure at a speed of 11 feet/minute. After exiting the lamps, the material passed through a 30 foot convection drying oven set at a temperature of 260° F. The moisture of the final composition is <5%. The final composition is approximately 82% polymer by weight and has the capability to absorb 250 grams of distilled water/gram of polymer with a free monomer content of approximately 95 ppm based on final composition weight.

EXAMPLE 4

To a reactor equipped with good agitation and cooling capable of maintaining the reaction temperature below 40° C., add 200 parts of water. With the agitator on and cooling on, add 66 parts of acrylic acid. Slowly add 110 parts of 50% potassium hydroxide at a rate such that the temperature of the mixture does not exceed 40° C. Agitate for 1 hour with cooling. Add 1 part Steol CS-460, 1 part Darocure 1173, and 0.6 parts NMBA and agitate for 15 minutes. This procedure will yield a 27% solids UV curable SAP monomer solution.

The resulting solution was used to impregnate a 4.0 mil, 0.5 oz/yd$^2$ nonwoven polyester. The impregnated polyester was then exposed to two 125 watt/inch and then two 300 watt/inch mercury arc UV curing lamps. The lamps were arranged with a 125 watt and a 300 watt lamp above the fabric and the remaining two lamps below. The lamps were equipped with eliptical reflectors and located 18 inches from the material. The lamps were arranged with a horizontal offset of 2 feet from the center of one bulb to the center of the next. The material was passed through this exposure at a speed of 8 feet/minute. After exiting the lamps, the material passed through a 30 foot convection drying oven set at a temperature of 260° F. The moisture of the final composition is <5%. The final composition is approximately 55% polymer by weight and has the capability to absorb 200 grams of distilled water/gram of polymer with a free monomer content of approximately 1000 ppm based on final composition weight.

EXAMPLE 5

The importance of utilizing the proper intensity of UV light in the formation of the composition is illustrated by the following results, which were obtained at various UV light distances. The UV lamp was 300 watts/inch. The line speed was 8 fpm. The Fibrous substrate was the fiberglass stated in Example 1. The following formulation was used:

| | |
|---|---|
| Water | 200 |
| Acrylic Acid | 66 |
| 45% Potassium Hydroxide | 110 |
| Steol CS-460 | 1 |
| Darocure 1173 | .6 |
| NMBA | 1 |

| Lamp Distance | Water absorbance/gram of polymer |
|---|---|
| 2.1 inches (focal point) | 30 |
| 9 inches | 100 |
| 18 inches | 200 |

The increase in the water absorbency per gram of polymer as a result of moving the UV lamps to 18 inches from the monomer impregnated fibrous substrate was dramatic and unexpected.

It is to be understood that the foregoing description is non-limiting and intended to further illustrate the present invention such that one skilled in the art can practice the invention and determine the metes and bounds of the appended claims. Other embodiments of the present invention will be apparent to one skilled in the art, and are intended to be encompassed by the appended claims.

We claim:

1. Method of controlling water egress from a water control zone into ground adjacent the water control zone or water ingress into the water control zone from the adjacent ground comprising the step of forming a water barrier in or on the adjacent ground, the water barrier including a layer of absorbent material comprising a fibrous substrate impregnated with a water absorptive, water insoluble polymer, wherein the polymer is intertwined and interlocked with fibers of the fibrous substrate, the water absorptive polymer is selected from the group consisting of polyacrylamide, polymers of acrylic acid neutralized to at least 40 molar percent with an alkali metal, and polyacrylamide-acrylic acid copolymers, and the water absorptive polymer is polymerized by UV radiation.

2. Method of controlling water as in claim 1 wherein the water barrier further comprises a barrier substrate layer and the layer of absorbent material is disposed adjacent the barrier substrate layer.

3. Method of controlling water as in claim 1 wherein the water control zone includes a reservoir having a bottom and sides and the step of forming the water barrier includes disposing the water barrier adjacent the bottom and sides of the reservoir.

4. Method of controlling water as in claim 1 wherein the water control zone is a waste disposal site.

5. Method of controlling water as in claim 4 wherein the waste disposal site is a landfill.

6. Method of controlling water as in claim 1 wherein the water absorptive composition is essentially non-toxic.

7. Method of controlling water as in claim 1 wherein the water absorptive polymer is polyacrylic acid neutralized to approximately 40 molar to 100 molar percent with an alkali metal.

8. Method of controlling water as in claim 1 wherein the water absorptive polymer is polyacrylic acid neutralized to approximately 60 molar to 100 molar percent with an alkali metal.

9. Method of controlling water as in claim 1 wherein the water absorptive polymer is polyacrylic acid formed from acrylic acid neutralized to approximately 40 molar to 100 molar percent with an alkali metal, and the fibrous substrate is fiberglass, wherein the water absorptive capacity is at least 50 grams distilled water per gram of polymer, and the residual free monomer is less than 100 ppm.

10. Method of controlling water as in claim 1 wherein the water absorptive material is made by the process comprising the steps of, impregnating the fibrous substrate with a solution capable of polymerizing upon exposure to UV irradiation to form the water absorptive polymer; and exposing the impregnated fibrous substrate to UV irradiation to polymerize the solution therein to form the polymer, so that the water absorptive polymer is intertwined and interlocked with fibers of the fibrous substrate.

11. Method of controlling water as in claim 10 wherein the water absorptive polymer is polyacrylic acid neutralized to approximately 40 molar to 100 molar percent with an alkali metal.

12. Method of controlling water as in claim 10 wherein the water absorptive polymer is polyacrylic acid neutralized to approximately 60 molar to 100 molar percent with an alkali metal.

13. Method of controlling water as in claim 10 wherein the UV irradiation is provided by 4 300 watt/inch UV lamps housed in elliptical reflectors located 18 inches from the fibrous substrate impregnated with the polymerizable solution, wherein two lamps are above and two lamps are below the substrate.

14. Method of controlling water as in claim 13 wherein the UV irradiation is 20 watts/inch to 700 watts/inch.

15. Method of controlling water as in claim 10 wherein the water absorptive polymer is polyacrylic acid formed from acrylic acid neutralized to approximately 40 molar to 100 molar percent with an alkali metal, and the fibrous substrate is fiberglass, wherein the water absorptive capacity is at least 50 grams distilled water per gram of polymer, and the residual free monomer is less than 100 ppm.

* * * * *